(12) United States Patent
Hirano et al.

(10) Patent No.: US 10,215,588 B2
(45) Date of Patent: Feb. 26, 2019

(54) POSITION DETECTING DEVICE AND STRUCTURE FOR USING POSITION DETECTING DEVICE

(71) Applicant: TDK CORPORATION, Tokyo (JP)

(72) Inventors: Hiroyuki Hirano, Tokyo (JP); Seiji Fukuoka, Tokyo (JP); Toshihiko Oyama, Tokyo (JP); Takahiro Moriya, Tokyo (JP); Kaoru Narita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/511,456

(22) PCT Filed: Apr. 13, 2016

(86) PCT No.: PCT/JP2016/061940
§ 371 (c)(1),
(2) Date: Mar. 15, 2017

(87) PCT Pub. No.: WO2016/171059
PCT Pub. Date: Oct. 27, 2016

(65) Prior Publication Data
US 2017/0284827 A1 Oct. 5, 2017

(30) Foreign Application Priority Data

Apr. 20, 2015 (JP) .................. 2015-086114

(51) Int. Cl.
*G01D 5/16* (2006.01)
*G01D 5/12* (2006.01)
*G01D 5/14* (2006.01)

(52) U.S. Cl.
CPC ............... *G01D 5/12* (2013.01); *G01D 5/147* (2013.01)

(58) Field of Classification Search
CPC ............ G01D 5/145; G01D 5/16; G01D 5/20; G01D 11/245; G01D 5/12; G01D 5/14; G01D 5/142; G01D 5/2013
(Continued)

(56) References Cited

U.S. PATENT DOCUMENTS 4,017,867 A * 4/1977 Claus ................... H01Q 3/2617
342/368
4,603,365 A * 7/1986 Nakamura ............. B82Y 25/00
324/225

(Continued)

FOREIGN PATENT DOCUMENTS

| JP | 52045953 A * | 4/1977 | ............... G01B 7/00 |
| JP | S52-45953 A | 4/1977 | |
| JP | 2006-023179 A | 1/2006 | |

OTHER PUBLICATIONS

October 24, 2017 International Preliminary Report on Patentability issued in International Patent Application No. PCT/JP2016/061940.
(Continued)

*Primary Examiner* — Jermele M Hollington
*Assistant Examiner* — Taqi Nasir
(74) *Attorney, Agent, or Firm* — Oliff PLC (57) ABSTRACT

A position detecting device includes a first bias magnet and a second bias magnet and a detecting element configured to detect a direction of a magnetic field generated by the first magnet and the second magnet. The first magnet and the second magnet are disposed with magnetic poles thereof having the same polarity arranged opposing each other. The direction of the magnetic field detected by the detecting element changes when an object to be detected D moves in an opposing direction between the first magnet and the second magnet.

9 Claims, 5 Drawing Sheets

(58) Field of Classification Search
USPC .... 324/203.21, 252, 207.12, 207.23–207.26, 324/235, 260, 207.21
See application file for complete search history.

(56) References Cited

U.S. PATENT DOCUMENTS

| | | | | |
|---|---|---|---|---|
| 4,810,954 A * | 3/1989 | Fam | ................... | G01R 21/002 324/126 |
| 4,810,965 A * | 3/1989 | Fujiwara | ................. | G01D 5/20 324/207.21 |
| 5,627,466 A * | 5/1997 | Spies | ................... | G01D 5/145 324/207.12 |
| 5,859,531 A * | 1/1999 | Maurice | ................ | G01D 5/344 250/227.17 |
| 6,338,396 B1 * | 1/2002 | Morishita | ............... | B66B 7/044 187/292 |
| 9,574,906 B2 * | 2/2017 | Abe | ......................... | G01D 5/16 |
| 2013/0127457 A1 * | 5/2013 | Musha | .................. | B82Y 25/00 324/252 |
| 2014/0292314 A1 * | 10/2014 | Tokida | ..................... | G01B 7/14 324/207.21 |
| 2015/0211890 A1 * | 7/2015 | Maiterth | ................ | G01D 5/142 324/207.2 |

OTHER PUBLICATIONS

Jul. 19, 2016 International Search Report issued in International Patent Application No. PCT/JP2016/061940.

\* cited by examiner

DIRECTION OF MAGNETIC FIELD (b)

DIRECTION OF MAGNETIC FIELD

Fig.4 ical Field

The present invention relates to a position detecting device and a structure for using the position detecting device.

Background Art

A device disclosed in Patent Literature 1 has been known as an example of a position detecting device. The position detecting device disclosed in Patent Literature 1 includes a magnetic member having N poles and S poles magnetized alternately, and a magneto resistive effect sensor disposed opposing to a surface of the magnetic member on which magnetic poles are arranged. The magneto resistive effect sensor includes a plurality of magnets and is provided on an object to be detected.

CITATION LIST

Patent Literature

Patent Literature 1: Japanese Unexamined Patent Publication No. 2006-23179

SUMMARY OF INVENTION

Technical Problem

As described above, the magneto resistive effect sensor includes a plurality of magnets. In some cases, however, enough space cannot be provided for attaching the magnets depending on the structure of an object to be detected. Thus, the position detecting device in the past can be used with limited kinds of objects to be detected. If the number of magnets is reduced, the effect to the magnetic field would decrease, causing only a small change in the direction of the magnetic field When the object to be detected moves largely, it is difficult to grasp the change of direction of the magnetic field depending on the position of the object to be detected. Therefore, only a narrow range of positions of the object to be detected can be detected.

In one aspect of the present invention, it is an object to provide a position detecting device capable of detecting a wide range of positions of various objects to be detected, while providing a structure for using such a position detecting device.

Solution to Problem

In one aspect of the present invention, a position detecting device configured to detect a position of an object to be detected formed of a magnetic substance includes a first magnet and a second magnet, and a detecting element configured to detect a direction of a magnetic field generated by the first magnet and the second magnet, in which the first magnet and the second magnet are disposed with magnetic poles thereof having the same polarity arranged opposing each other, and the direction of the magnetic field detected by the detecting element changes when the object to be detected moves in an opposing direction between the first magnet and the second magnet.

In the position detecting device according to one aspect of the present invention, the first magnet and the second magnet are disposed with the magnetic poles thereof having the same polarity arranged opposing each other. The detecting element detects, at the position of the detecting element, the direction of the magnetic field that changes when the object to be detected moves in the opposing direction between the two magnets. The magnetic field that is generated by the two magnets with the magnetic poles thereof having the same polarity arranged opposing each other is established by subtle balancing of magnetic lines of force occurring from each magnet. The direction of the magnetic field changes largely upon receiving external effect, such as shielding and/or absorbing the magnetic lines of force. The position detecting device, therefore, can detect, at the position of the detecting element, the change of direction of the magnetic field in accordance with the movement of the object to be detected, if the object to be detected does not affect largely on the magnetic field. The position detecting device can detect a wide range of positions of various objects to be detected.

In an embodiment, the object to be detected may be located in a range between the first magnet and the second magnet when seen from a direction orthogonal to the opposing direction. In this structure, the object to be detected moves between the first magnet and the second magnet. The movement of the object to be detected effectively acts on the direction of the magnetic field. The detecting element can more reliably detect the change of direction of the magnetic field. This leads to accurate position detection of the object to be detected.

In the embodiment, the object to be detected may partially be located between the first magnet and the second magnet. In this structure, it is easy to set the positions of the first magnet and the second magnet relative to the object to be detected and prevent occurrence of positional displacement between the positions of the object to be detected and the first magnet and the second magnet. The direction of the magnetic field can, therefore, be affected more accurately by the movement of the object to be detected. The detecting element can more reliably detect the change of direction of the magnetic field. This leads to accurate position detection of the object to be detected.

In the embodiment, the detecting element may be disposed, in a state in which the object to be detected D affects the direction of the magnetic field, between a position at which the magnetic field is offset in a range from the first to second magnets and the position of the object to be detected, when seen from the direction orthogonal to the opposing direction. In this structure, the detecting element can more reliably detect the direction of the magnetic field. This leads to accurate position detection of the object to be detected.

In the embodiment, the object to be detected may be a soft magnetic substance. When the object to be detected itself is the soft magnetic substance such as iron, it is not necessary to provide magnets or the like on the object to be detected. When there is no need to secure regions to attach magnets or the like on the object to be detected, it is possible to detect positions of various objects to be detected.

In the embodiment, the object to be detected may be in a plate-like shape. When the object to be detected is in a plate-like shape, it is easy to shield and/or absorb the magnetic lines of force occurring from the magnets. This increases the effect (influence) of the object to be detected to the magnetic field. As a result, the direction of the magnetic field changes significantly in accordance with the movement of the object to be detected D, allowing more accurate position detection of the object to be detected D.

A structure for using a position detecting device according to the present invention includes a position detecting device including a first magnet and a second magnet and a detecting element configured to detect a direction of a magnetic field generated by the first magnet and the second magnet, and an object to be detected formed of a magnetic substance and affecting a direction of the magnetic field in accordance with movement of the object to be detected, in which the first magnet and the second magnet are disposed with magnetic poles thereof having the same polarity arranged opposing each other, and the direction of magnetic field detected by the detecting element changes as the object to be detected moves in an opposing direction between the first magnet and the second magnet.

In the structure for using the position detecting device, the first magnet and the second magnet of the position detecting device are disposed with the magnetic poles thereof having the same polarity arranged opposing each other. The detecting element detects, at the position of the detecting element, the direction of the magnetic field that changes when the object to be detected moves in the opposing direction between the two magnets. The magnetic field that is generated by the two magnets with the magnetic poles thereof having the same polarity arranged opposing each other is established by subtle balancing of magnetic lines of force occurring from each magnet. The direction of the magnetic field changes largely upon receiving external effect, such as shielding and/or absorbing the magnetic lines of force. The position detecting device, therefore, can detect, at the position of the detecting element, the change of direction of the magnetic field in accordance with the movement of the object to be detected, if the object to be detected does not affect largely on the magnetic field. The structure for using the position detecting device can detect a wide range of positions of various objects to be detected.

Advantageous Effects of Invention

In one aspect of the present invention, a wide range of positions of the object to be detected can be detected.

DESCRIPTION OF EMBODIMENT

A preferred embodiment of the invention will be described in detail below by referring to the accompanying drawings. In the description of the drawings, the same reference signs are given to the same or similar elements, and the description thereof will not be repeated.

Figure 1:
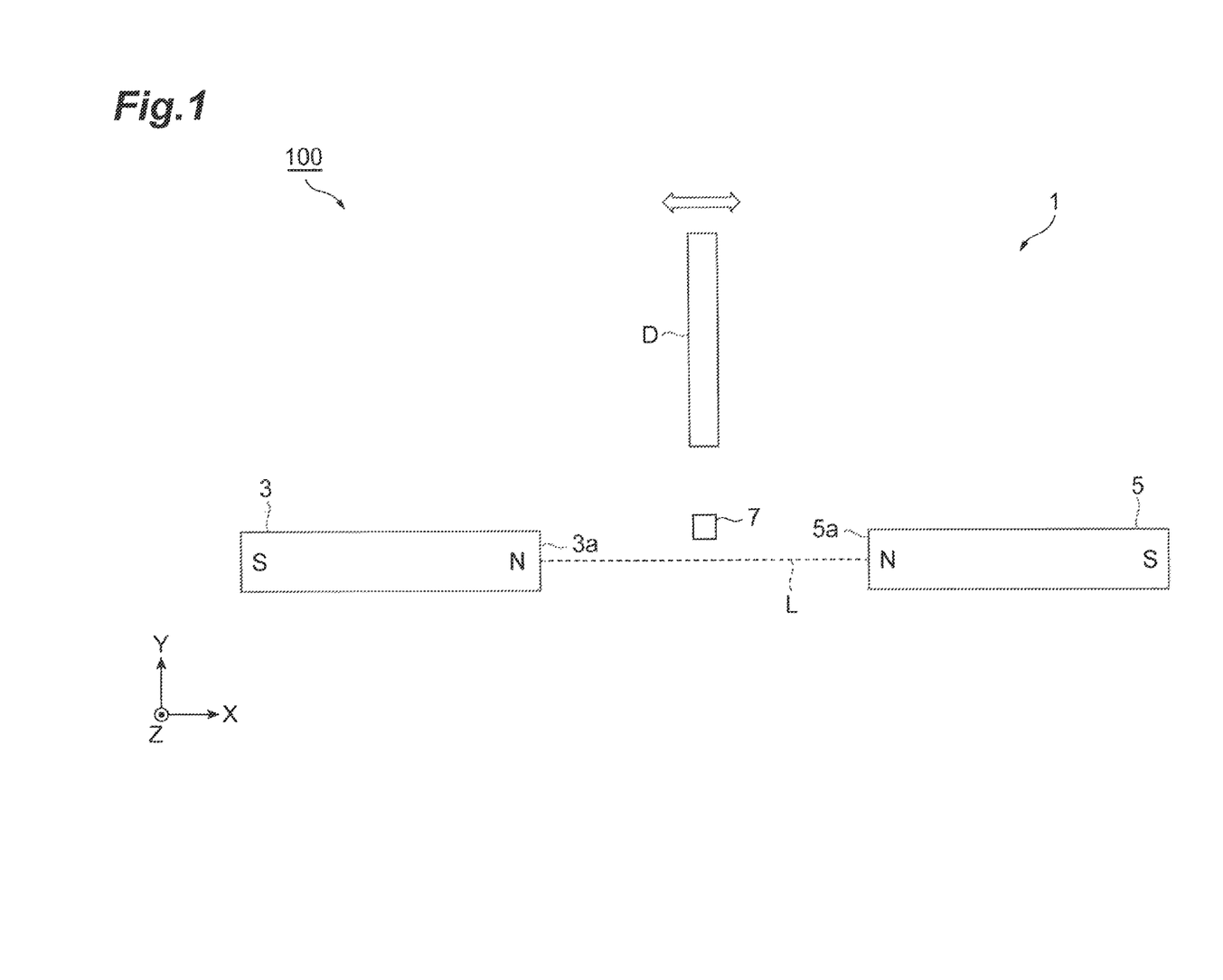
FIG. 1 illustrates a structure for using a position detecting device, in which the structure includes a position detecting device according to an embodiment.

FIG. 1 illustrates a structure for using a position detecting device, in which the structure includes a position detecting device according to an embodiment. As illustrated in FIG. 1, a structure 100 for using a position detecting device includes a position detecting device 1 and an object to be detected D. The position detecting device 1 detects a position of an object to be detected D. The position detecting device 1 includes a first bias magnet (first magnet) 3, a second bias magnet (second magnet) 5, and a detecting element 7. In the following description, three directions (X, Y, and Z directions) which are orthogonal to one another as defined in FIG. 1 may be used for explanation.

First, the object to be detected D whose position is detected by the position detecting device 1 is described. The object to be detected D is a soft magnetic substance (magnetic substance). For example, the soft magnetic substance is such as iron or iron alloy. The object to be detected D is, for example, in a disc shape (plate-like shape) (and in a circular shape when seen from the X-direction). FIG. 1 illustrates an example of the object to be detected D which is a rectangular shape when seen from the Z-direction. In practice, however, the object to be detected D may be in a different shape. The object to be detected D moves in the X-direction (which is also an opposing direction described later), as indicated by an arrow in FIG. 1.

Next, the position detecting device 1 is formed as described below. The first bias magnet 3 and the second bias magnet 5 are magnets, such as neodymium magnets (rare-earth magnets) or ferrite magnets. The first bias magnet 3 and the second bias magnet 5 are in the same shape. In the present embodiment, the first bias magnet 3 and the second bias magnet 5 are both in an oblong shape (rod-like shape).

The first bias magnet 3 and the second bias magnet 5 are disposed with magnetic poles thereof having the same polarity (magnetic polarity) arranged opposing each other. In the present embodiment, the first bias magnet 3 and the second bias magnet 5 are disposed so that N poles oppose each other in the X-direction. Specifically, the first bias magnet 3 and the second bias magnet 5 are disposed to oppose each other in such a manner that an end face (N-pole face) 3a of the first bias magnet 3 opposes and extends in parallel with an end face (N-pole face) 5a of the second bias magnet 5 in the Y-direction (Z-direction).

In the present embodiment, the first bias magnet 3 and the second bias magnet 5 are disposed so that a straight line L connecting centers of the end faces 3a and 5a of the first and second bias magnets 3 and 5, respectively, is in parallel with the X-direction. Namely, the opposing direction between the first bias magnet 3 and the second bias magnet 5 is in the X-direction. A distance between the first bias magnet 3 and the second bias magnet 5 is appropriately set in accordance with the movement of the object to be detected D that moves in the X-direction. A distance between the first bias magnet 3 and the second bias magnet 5 is at least set to the maximum movement of the object to be detected D. The object to be detected D is located in a range between the first bias magnet 3 and the second bias magnet 5, when seen from the direction orthogonal to the above-described opposing direction. Namely, the object to be detected D moves, when seen from the Z-direction, in a range defined by a line (extending in the Y-direcfion) along the end face 3a of the first bias magnet 3 and a line along the end face 5a of the second bias magnet 5. The object to be detected D is positioned so that a thickness thereof extends in the X-direction.

The detecting element 7 detects the direction of the magnetic field generated by the first bias magnet 3 and the second bias magnet 5. Specifically, the detecting element 7 detects the direction (vector) of the magnetic field applied to the detecting element 7 from the first bias magnet 3 and the second bias magnet 5. Namely, the detecting element 7 detects the direction of magnetic lines of force at the position of the detecting element 7. An element, such as a Hall element, a Hall integrated circuit (IC), or a giant magneto resistive effect (GMR) element may be used as the detecting element 7. Specifically, the detecting element 7 may include, for example, a plurality of Hall elements and a magnetic substance yoke, or a plurality of spin-valve-type magneto resistive elements.

Figure 2:
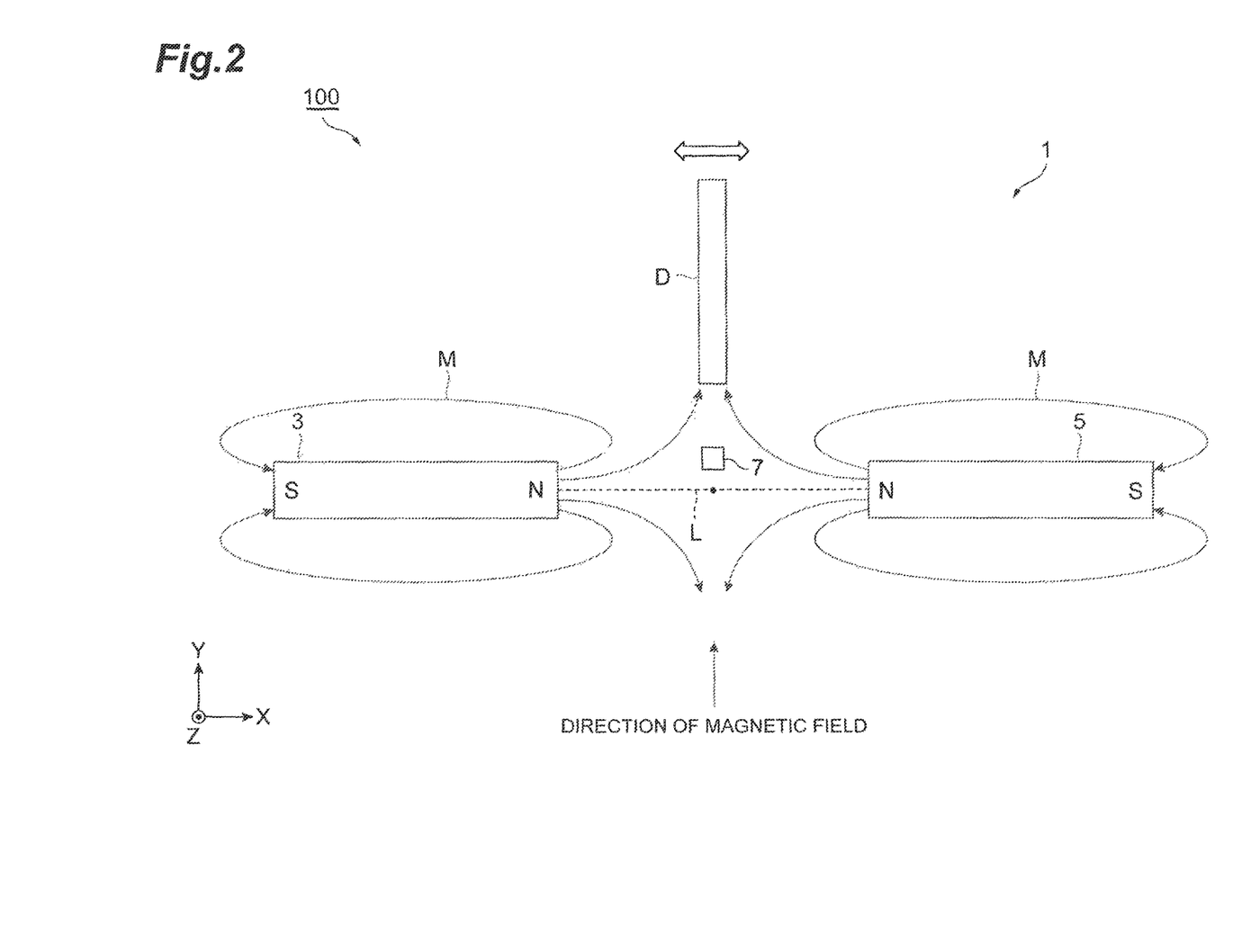
FIG. 2 illustrates magnetic lines of force of first and second bias magnets.

In a state in which the object to be detected D affects the direction of the magnetic field, the detecting element 7 is disposed, when seen from the direction orthogonal to the opposing direction, between the object to be detected D and a position at which the magnetic fields of the first bias magnet 3 and the second bias magnet 5 are offset each other. The state in which the object to be detected D affects the direction of the magnetic field represents a state in which the direction of the magnetic field generated by the first bias magnet 3 and the second bias magnet 5 has changed, as illustrated in FIG. 2, from the direction of the magnetic field in the case where no object to be detected D is present by shielding and/or absorbing magnetic lines of force M by the object to be detected D. The position at which the magnetic fields are offset each other is a position at which the magnetic field of the first bias magnet 3 and the opposite magnetic field of the second bias magnet 5 are offset, that is, a point of zero magnetic field. In the present embodiment, the zero magnetic field is indicated, for example, by a black dot on the straight line L in FIG. 2, when the object to be detected D is located at the center between the first bias magnet 3 and the second bias magnet 5 and above the straight line L.

In the present embodiment, the detecting element 7 is partially disposed between the first bias magnet 3 and the second bias magnet 5, while also disposed between the zero magnetic field and the object to be detected D. Specifically, the detecting element 7 is disposed, as illustrated in FIG. 2, above the straight line L and in the center of the distance between the first bias magnet 3 and the second bias magnet 5. The detecting element 7 outputs a signal indicating the direction of the detected magnetic field.

Figure 3:
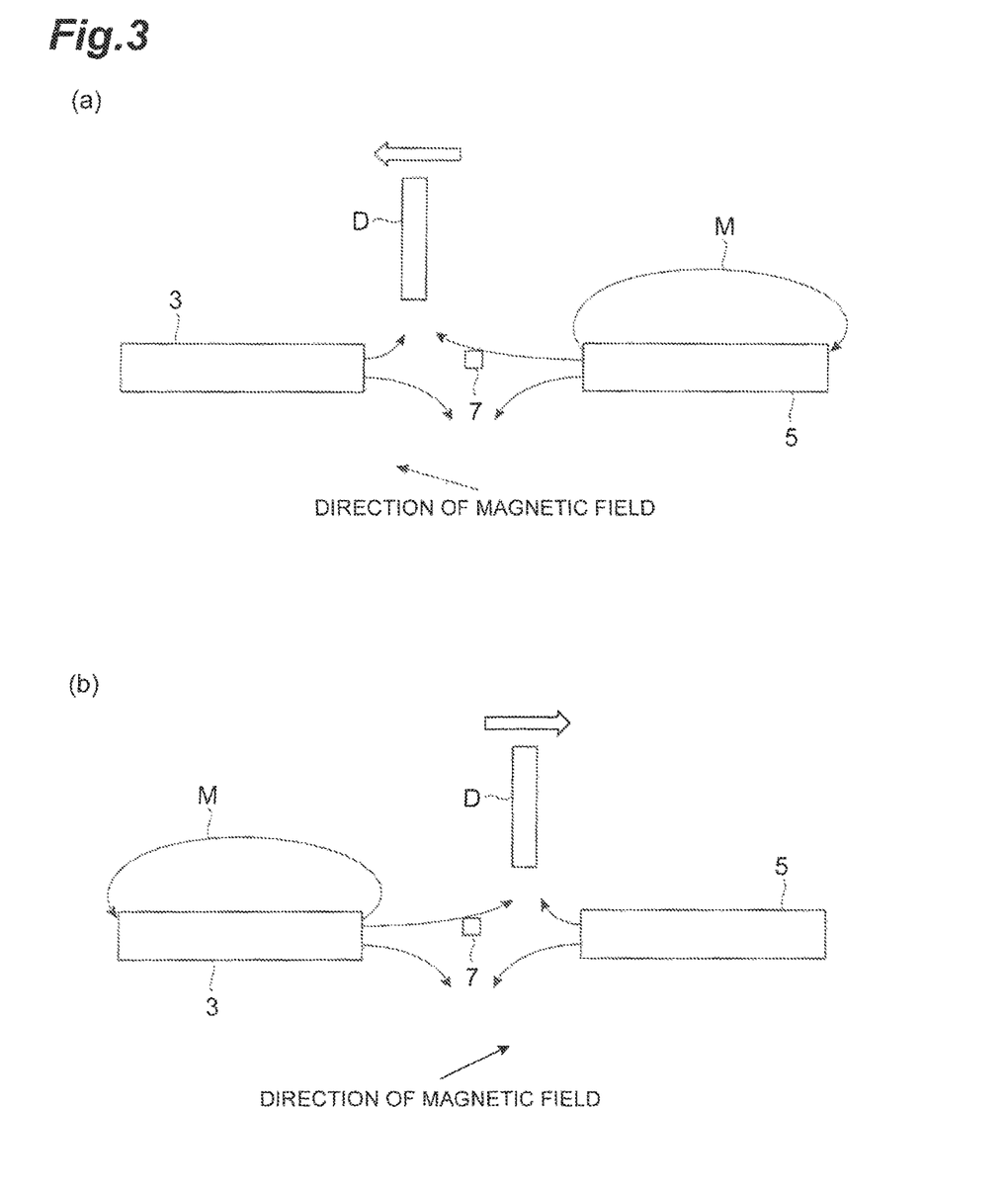
FIGS. 3(a) and 3(b) illustrate relationships between an object to be detected and a direction of the magnetic field.

Next, a method of detecting a position of the object to be detected D by the position detecting device 1, which is structured as described above, is described by referring to FIG. 2 and FIGS. 3(*a*) and 3(*b*). In FIG. 2 and FIGS. 3(*a*) and 3(*b*), the magnetic lines of force M are illustrated schematically.

As illustrated in FIG. 2, when the object to be detected D is located at an intermediate point (immediately above the detecting element 7) between the first bias magnet 3 and the second bias magnet 5 the magnetic fields of the first bias magnet 3 and the second bias magnet 5 individually affect the detecting element 7 nearly equally. At this time, the detecting element 7 detects an upward direction (Y-direction) of the magnetic field at the position of the detecting element 7, as indicated by an arrow in FIG. 2.

When the object to be detected D moves in the position detecting device 1, the magnetic fields generated by the first bias magnet 3 and the second bias magnet 5 change their direction at the position of the detecting element 7. Specifically, as illustrated in FIG. 3(*a*), when the object to be detected D moves leftward in the drawing, the magnetic lines of force M change in accordance with the movement. At this time, the object to be detected D absorbs and/or shields the magnetic lines of force occurring from the first bias magnet 3. The direction of the magnetic field, which is detected by the detecting element 7, therefore, becomes largely affected by the magnetic field of the second bias magnet 5. As a result, the detecting element 7 detects the leftward direction of the magnetic field, as indicated by an arrow in FIG. 3(*a*).

When the object to be detected. D moves rightward in the drawing, as illustrated in FIG. 3(*b*), the magnetic lines of force M change in accordance with the movement. At this time, the object to be detected D absorbs and/or shields the magnetic lines of force occurring from the second bias magnet 5. The direction of the magnetic field, which is detected by the detecting element 7, becomes largely affected by the magnetic field of the first bias magnet 3. As a result, the detecting element 7 detects the rightward direction of the magnetic field, as indicated by an arrow in FIG. 3(*b*).

As described above, the direction of the magnetic field changes at the position of the detecting element 7 in accordance with the movement of the object to be detected D. The position detecting device 1 detects the position of the object to be detected D on the basis of the direction of the magnetic field at the position of the detecting element 7. The position detecting device 1 correlates the directions of the magnetic field with positions of the object to be detected D in one-to-one relationship. The position detecting device 1 detects (identifies) the position of the object to be detected D by detecting the direction of the magnetic field. By detecting the position of the object to be detected D, the position detecting device 1 can, therefore, detects the movement of the object to be detected D.

Figure 4:
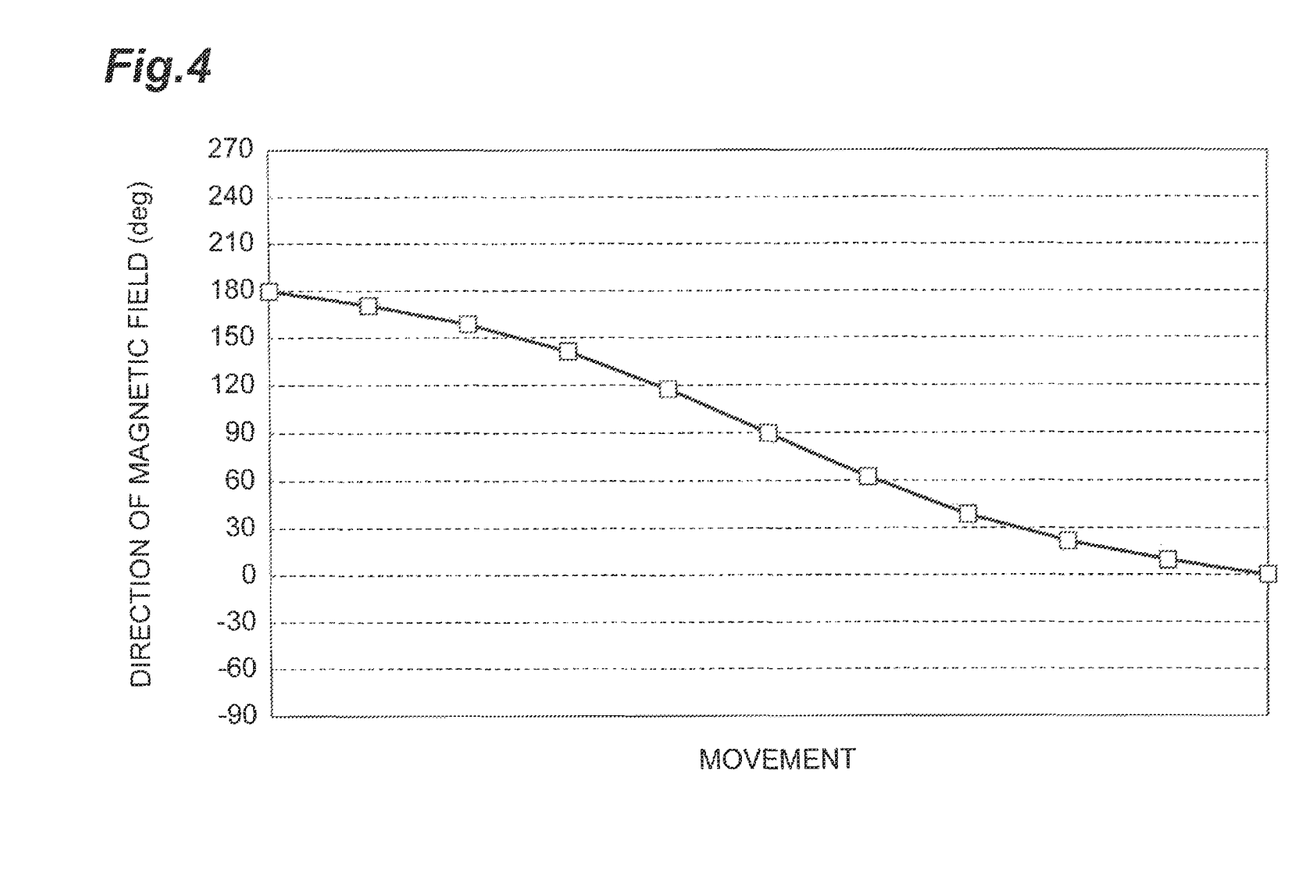
FIG. 4 is a graph plotting degrees of magnetic lines of force at the position of the detecting element relative to the movement of the object to be detected.

FIG. 4 is a graph plotting the direction of the magnetic field at the position of the detecting element 7 relative to the movement of the object to be detected D. In FIG. 4, the horizontal axis represents the movement of the object to be detected D in the X-direction, and the vertical axis represents the direction of the magnetic field (degrees [deg] of the direction of the magnetic lines of force relative to a predetermined reference) at the position of the detecting element 7. The direction of the magnetic field indicated along the vertical axis is set to "90 deg" when the object to be detected D is located at the intermediate position (immediately above the detecting element 7) between the first bias magnet 3 and the second bias magnet 5, as illustrated in FIG. 2.

As illustrated in FIG. 4, when the object to be detected D moves leftward in the drawing as illustrated in the FIG. 3(*a*), the direction of the magnetic field at the position of the detecting element 7 becomes positive (up to 180 deg) relative to the 90-deg reference. When the object to be detected D moves rightward in the drawing as illustrated in the FIG. 3(*b*), the direction of the magnetic field at the position of the detecting element 7 becomes negative (down to 0 deg) relative to the 90-deg reference. Thus, the position detecting device 1 can detect the change of the direction of the magnetic field at least in a range from 0 to 180 [deg]. The position detecting device 1 can therefore detect a wide range of movement (e.g., from 15 mm to 20 mm) of the object to be detected D.

As described above, the position detecting device 1 according to the present embodiment includes the first bias magnet 3 and the second bias magnet 5 disposed with their magnetic poles having the same polarity opposing each other. The detecting element 7 detects the direction of the magnetic field at the position of the detecting element 7 as the magnetic field changes its direction in accordance with the movement of the object to be detected D in the opposing direction between the two bias magnets 3, 5. The magnetic field that is generated by the two bias magnets 3, 5 with the magnetic poles thereof having the same polarity arranged opposing each other is established by delicate balancing of magnetic lines of force occurring from each of the bias magnets 3, 5. The direction of the magnetic field changes largely upon receiving external effect, such as shielding and/or absorbing the magnetic lines of force. The position detecting device 1, therefore, can detect, at the position of the detecting element 7, the change of direction of the magnetic field in accordance with the movement of the object to be detected D, if the object to be detected D does not affect largely on the magnetic field. The position detecting device 1 can detect a wide range of positions of the various objects to be detected D.

In the present embodiment, the object to be detected D is located in a range between the first bias magnet 3 and the second bias magnet 5 when seen from the direction orthogonal to the opposing direction. In this structure, the object to be detected D moves in the range between the first bias magnet 3 and the second bias magnet 5. The movement of the object to be detected D effectively affects the direction of the magnetic field. The detecting element 7, therefore, can more reliably detect the change of direction of the magnetic field. This leads to accurate position detection of the object to be detected D.

In the present embodiment, the detecting element 7 is disposed, in the state in which the object to be detected D affects the direction of the magnetic field, between the position at which the magnetic fields are offset each other between the first bias magnet 3 and the second bias magnet 5 and the object to be detected D, when seen from the direction orthogonal to the opposing direction. In this structure, the detecting element 7 can reliably detect the direction of the magnetic field. This leads to accurate position detection of the object to be detected D.

In the present embodiment, the object to be detected D is a soft magnetic substance. When the object to be detected D itself is a soft magnetic substance such as iron, there is no need to provide magnets on the object to be detected D. When there is no need to secure regions to attach magnets or the like on the object to be detected D, it is possible to detect positions of various objects to be detected D.

In the present embodiment, the object to be detected D is in a disc shape. When the object to be detected D is in a disc (plate-like) shape, it is easy to shield and/or absorb the magnetic lines of force occurring from the first bias magnet 3 and the second bias magnet 5, This allows increase of the effect (influence) on the magnetic field of the object to be detected D. As a result, the direction of the magnetic field changes significantly in accordance with the movement of the object to be detected D, allowing more accurate position detection of the object to be detected D.

The present invention is not limited to the above-described embodiment. For example, the first bias magnet 3 and the second bias magnet 5 both having the oblong (rod-like) shape have been described as an example in the above embodiment. Alternatively, the first bias magnet 3 and the second bias magnet 5 may be in another shape. The first bias magnet 3 and the second bias magnet 5 may be, for example, in a disc shape, ring shape, or the like.

The first bias magnet 3 and the second bias magnet 5 are in the same shape in the above-described embodiment. Alternatively, the first bias magnet 3 and the second bias magnet 5 may be different in shape (size). The magnets may be in different shapes so long as the relationship to correlate the direction of the magnetic field detected by the detecting element 7 to the position of the object to be detected D is established.

Figure 5:
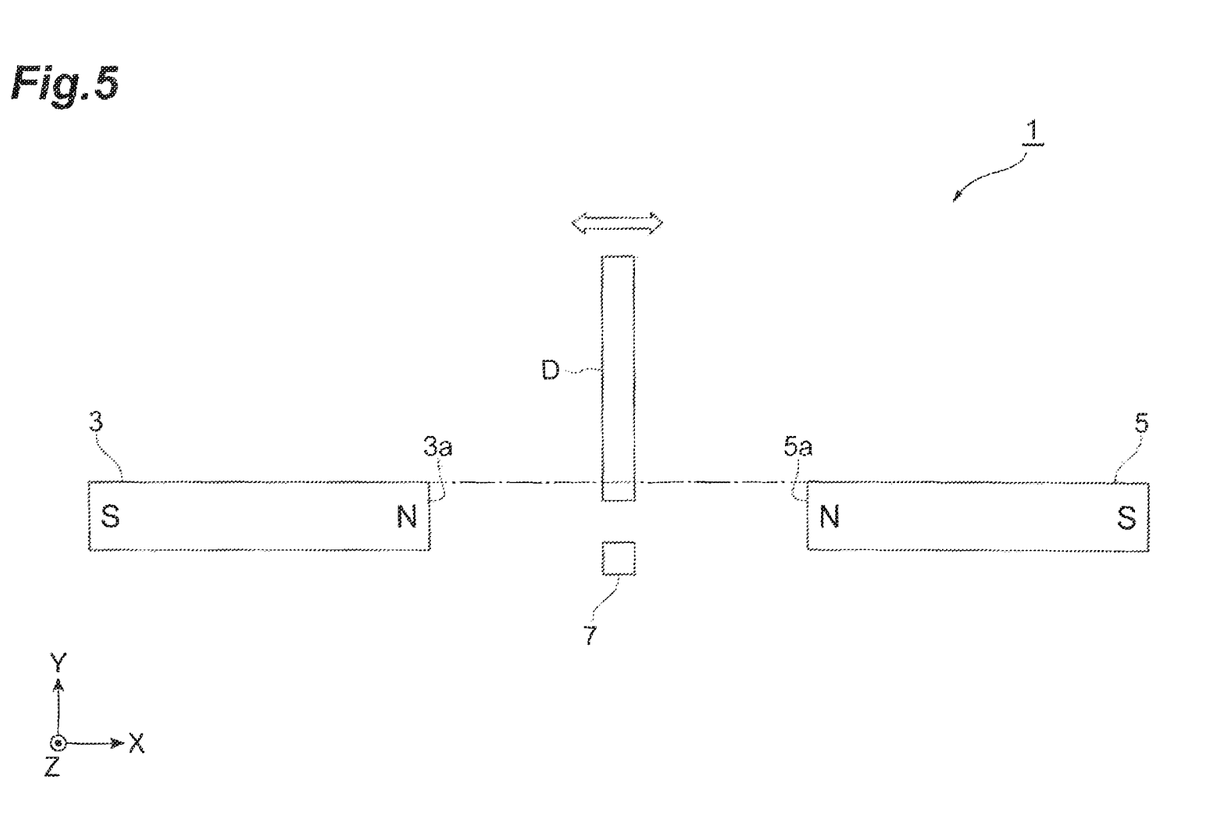
FIG. 5 illustrates a structure for using the position detecting device according to another embodiment.

In the embodiment, as illustrated in FIG. 1, the example in which the object to be detected D is located above the first bias magnet 3 and the second bias magnet 5 in the drawing, that is, the object to be detected D is not located between the first bias magnet 3 and the second bias magnet 5, has been described. As illustrated in FIG. 5, however, the object to be detected D may be located between the first bias magnet 3 and the second bias magnet 5, that is, the object to be detected D may at least partially be located in (invaded into) the region between the first bias magnet 3 and the second bias magnet 5. Specifically, the tip of the object to be detected D is located in the region between the first bias magnet 3 and the second bias magnet 5. In this structure, the positions of the first bias magnet 3 and the second bias magnet 5 relative to the object to be detected D can easily be set, decreasing displacement of the positions between the first bias magnet 3 and the second bias magnet 5 and the object to be detected D. This allows more accurate influence on the direction of the magnetic field by the movement of the object to be detected D. The detecting element 7, therefore, can more reliably detect the change of direction of the magnetic field. This leads to accurate position detection of the object to be detected D.

In the embodiment, the example in which the object to be detected D itself is a soft magnetic substance has been described. Alternatively, the object to be detected D may be in another shape. The object to be detected D may include the magnetic substance (soft magnetic substance). For example, the object to be detected D may be formed by providing a magnetic substance (e.g., magnet or metal) on the object to be detected (which is made of a material other than the magnetic substance). In this case, the number, shape, or the like of the magnetic substance need to be set appropriately in compliance with the structure of the object to be detected. The position detecting device according to the present invention can detect the position of the object to be detected even when one magnetic substance is provided.

The above embodiment has described the example in which the first bias magnet 3 and the second bias magnet 5 are disposed with N poles thereof arranged opposing each other in the X-direction. Alternatively, the first bias magnet 3 and the second bias magnet 5 can be disposed with S poles thereof arranged opposing each other. Namely, the first bias magnet 3 and the second bias magnet 5 need to be disposed with their magnetic poles having different polarities arranged opposing each other.

The above embodiment has described the example in which the first bias magnet 3 and the second bias magnet 5 are disposed with end faces 3a, 5a thereof extend in parallel with the Y-direction such that the first bias magnet 3 and the second bias magnet 5 oppose each other. Alternatively, the first bias magnet 3 and the second bias magnet 5 may be disposed differently. For example, the first bias magnet 3 and the second bias magnet 5 may oppose each other at a predetermined angle between imaginary lines along the end faces 3a, 5a of the first bias magnet 3 and the second bias magnet 5. Namely, the first bias magnet 3 and the second bias magnet 5 do not need to extend in the direction disposed on the same straight line. In this case, the first bias magnet 3 and the second bias magnet 5 oppose each other in the extending direction of the straight line connecting the centers of the end faces 3a, 5a, that is in the X-direction.

The above embodiment has described the example in which the detecting element 7 is located above the straight line L and is partially located between the first bias magnet 3 and the second bias magnet 5. Alternatively, the detecting element 7 may be located at a different position. The detecting element 7 needs to be disposed between the zero magnetic field and the object to be detected D. When seen from the direction orthogonal to the opposing direction, the detecting element 7 needs to be disposed in the range between the first bias magnet 3 and the second bias magnet 5. Namely, the detecting element 7 needs to be disposed in the range (region), when seen from the Z-direction, partitioned by a line (extending in the Y-direction) along the end face 3a of the first bias magnet 3 and a line along the end face 5a of the second bias magnet 5.

REFERENCE SIGNS LIST

1 Position detecting device
3 First bias magnet (First magnet)
5 Second bias magnet (Second magnet)
7 Detecting element
100 Structure for using position detecting device
D Object to be detected

The invention claimed is:

1. A position detecting device to detect a position of an object formed of a magnetic substance, comprising:
    a first magnet;
    a second magnet; and
    a detecting element that detects a direction of a magnetic field generated by the first magnet and the second magnet, wherein
    the first magnet and the second magnet are spaced apart and disposed with magnetic poles thereof having the same polarity arranged opposing each other in an opposing direction,
    the first magnet, the second magnet and the detecting element are positioned such that the direction of the magnetic field detected by the detecting element changes when the object (1) is located between the first magnet and the second magnet, when seen from a direction orthogonal to the opposing direction, and (2) moves along the opposing direction between the first magnet and the second magnet, and
    the detecting element is disposed, in a state in which the object affects the direction of the magnetic field, between the object and a position where the magnetic fields of the first magnet and the second magnet are offset, when seen from the direction orthogonal to the opposing direction.

2. The position detecting device according to claim 1, wherein the first magnet and the second magnet have opposing parallel end faces.

3. The position detecting device according to claim 2, wherein the opposing direction is on a straight line connecting centers of the opposing parallel end faces.

4. A method to detect a position of an object formed of a magnetic substance, comprising the steps of:
    providing a position detecting device including a first magnet, a second magnet that is spaced from the first magnet, and a detecting element that detects a direction of a magnetic field generated by the first magnet and the second magnet, the first and the second magnet being disposed with magnetic poles thereof having the same polarity opposing each other in an opposing direction;
    positioning the object, when seen from a direction orthogonal to the opposing direction, (1) relative to the first magnet, the second magnet and the detecting element such that the direction of the magnetic field generated by the detecting element changes when the object moves along the opposing direction between the first magnet and the second magnet and (2) such that the detecting element is between the object and a position where the magnetic fields of the first magnet and the second magnet are offset; and
    determining the direction of the magnetic field by the detecting element.

5. The method to detect a position of an object formed of a magnetic substance according to claim 4, wherein
    the object is located between the first magnet and the second magnet, when seen from a direction orthogonal to the opposing direction.

6. The method to detect a position of an object formed of a magnetic substance according to claim 5, wherein
    the object is at least partially located between the first magnet and the second magnet.

7. The method to detect a position of an object formed of a magnetic substance according to claim 4, wherein
    the object to be detected is a soft magnetic substance.

8. The method to detect a position of an object formed of a magnetic substance according to claim 4, wherein
    the object has a plate-like shape.

9. The method to detect a position of an object formed of a magnetic substance according to claim 4, wherein the object is moved between end faces of the first magnet and the second magnet when seen from the direction orthogonal to the opposing direction.

* * * * *